United States Patent [19]

Matsukura

[11] Patent Number: 5,052,366

[45] Date of Patent: Oct. 1, 1991

[54] WIRE SAW

[75] Inventor: Yasumasa Matsukura, Kashihara, Japan

[73] Assignees: Takatori Corporation; Takatori Hitech Co., Ltd., both of Nara, Japan

[21] Appl. No.: 446,764

[22] Filed: Dec. 6, 1989

[51] Int. Cl.⁵ .................... B28D 1/08; B26D 1/547
[52] U.S. Cl. ..................... 125/16.01; 83/647; 83/651.1
[58] Field of Search ............ 125/16.01, 16.02; 83/651.1, 13, 812, 647

[56] References Cited

U.S. PATENT DOCUMENTS

| | | | |
|---|---|---|---|
| 4,018,117 | 4/1977 | Patterson | 83/651.1 |
| 4,574,769 | 3/1986 | Ishikawa | 125/16.01 |
| 4,579,026 | 4/1986 | Tsune | 83/13 |
| 4,903,682 | 2/1990 | Kurokawa | 83/651.1 |

Primary Examiner—Hien H. Phan
Attorney, Agent, or Firm—Wenderoth, Lind & Ponack

[57] ABSTRACT

A wire saw has a wire wound a number of turns around a plurality of multigrooved rollers to form rows of the wire between the rollers which cut a workpiece. By reversibly rotating the multigrooved rollers, the wire is moved gradually from a wire feeding side to wire recovery side of the saw while undergoing a reciprocating motion between the multigrooved rollers. In addition, the multigrooved rollers are rotated around a fixed axis to swing the wire in a manner that provides contact with the workpiece which is quite close to point contact. Thus, a concentrated load is applied to the workpiece fully utilizing the permissible tension on the wire, and thus accelerating the cutting speed and raising the cutting accuracy. Moreover, movable-pulley type double-speed mechanisms disposed at the wire feeding side and at the recovery side, respectively, are driven by an endless rope moving synchronously and along a corresponding locus with the wire, to absorb tension and slack alternately generated at the wire feeding side and recovery side.

3 Claims, 7 Drawing Sheets

WIRE SAW

BACKGROUND OF THE INVENTION

The present invention relates to a wire saw comprising a wire reeved about a plurality of multigrooved rollers for cutting a workpiece.

A wire saw has been known in which a wire is wound a number of turns around the outer periphery of a plurality of multigrooved rollers, and cuts a workpiece at a position between the multigrooved rollers while undergoing reciprocating motion.

The above-described wire saw is so constructed that fixed rollers and movable rollers are disposed to guide the wire between the multigrooved rollers from a wire feeding side to a wire recovery side. The wire is gradually fed to the recovery side during its reciprocation between the multigrooved rollers, which reciprocation is caused by movement of the movable rollers toward and away from the fixed rollers, thus causing the workpiece to be cut. In this cutting operation, a mixture of abrasive and lapping oil is used between the workpiece and the wire.

In order to obtain an effective cutting operation, a concentrated load must be applied to a contact area between the wire and the workpiece and the permissible tensile force on the wire must be made the most of. When using a free abrasive, a uniform permeation of a mixture of the abrasive and lapping oil is required between the wire and the workpiece. In addition, swarf must be smoothly discharged.

In the conventional wire saw, multigrooved rollers are rotatably disposed at fixed positions during the cutting of a workpiece supported on a mounting table such that the wire is held against the workpiece while moving in a straight line, thereby causing the wire B to be in linear contact with the workpiece A as shown in FIG. 10.

But this linear contact poses a problem in that a good flow of mixed fluid consisting of abrasive and lapping oil is prevented and the resistance offered against the movement of the wire is high, thus lowering the cutting effect.

In addition, other problems also occur in that, because of the linear contact, swarf cannot be discharged with ease. Thus, the cutting effect is lowered, wire tensile force is dispersed, a concentrated load cannot be exerted on the workpiece, and the permissible tension on the wire is not made the most of.

In a wire saw, it is required that the wire be wound a number of turns around outer periphery of a plurality of multigrooved rollers to form rows of wire, and that a reciprocal running motion be given to the wire being fed from the feeding side to the recovery side, resulting in wire tension and slack being alternately generated at the feeding and recovery sides with the multigrooved roller group interposed therebetween.

Thus, in a wire saw, a mechanism must be adopted to absorb the tension and slack occurring in the wire while the wire undergoes a reciprocating running motion.

A mechanism for absorbing tension and slack in the conventional wire saw is constructed in the following manner. Fixed rollers and movable rollers are disposed to guide a wire thereover, in turn, between multigrooved rollers and the wire feeding side, and between the multigrooved rollers and wire recovery side. The movable rollers are fixed to a large and heavy slide carriage which is reciprocated by a drive motor using a crank mechanism. The reciprocating motion of the slide carriage indirectly imparts to the multigrooved rollers a reversing rotary movement through an endless rope extending over the above-described fixed rollers and movable rollers. And, the wire is fed gradually toward the recovery side while it is moved back and forth at the outer periphery of the multigrooved roller group.

The following problems occur in the mechanism for absorbing tension and slack mentioned above.

(1) Because the slide carriage reciprocated by the drive motor and crank mechanism is used to absorb tension and slack resulting from the reciprocating motion of the wire, a large and heavy slide carriage must be moved, which results in a high loss of energy during the cutting operation, and imposes a limit on the speed of operation and hence the cutting accuracy.

(2) In order to drive the multigrooved rollers with a reversing rotary movement and a differential rotary motion via the movable-pulley type double-speed mechanism and crank mechanism, an endless rope is used. Since the drive system thus requires a high transmission capacity, the system must be large. This, in turn, necessitates that a long special endless rope such as a two-sided toothed belt or chain, which is expensive and not readily available, be employed for synchronizing the wire and movable-pulley type double-speed mechanism.

(3) Noise and vibration peculiar to using the above-described long, special endless rope in a high-speed operation, are generated to such a degree as to impose a limit on the speed of operation thereby diminishing cutting accuracy and the volume of work which can be carried out.

(4) Because a long special endless rope is used, the movable-pulley type double-speed mechanism must adopt specially toothed sprockets which are costly. When the number of teeth of such sprockets are few in order to make the diameter of the sprockets small for achieving a compactness of the device, fluctuations occur during the revolution of the sprockets caused by a polygonal movement peculiar thereto. Thus, such sprockets become a source of noise and vibration, cause a change in wire tension delicately driven synchronously, cause the rope to become disconnected from the drive system, and lower cutting accuracy.

(5) Due to the reciprocating motion of the wire caused by the crank mechanism, the running speed of the wire changes momentarily as a function of a sine curve, thus preventing stabilization through the uniform permeation of abrasive fluid between the workpiece and wire as well as a smooth discharge of swarf which would otherwise be usually expected by the effective utilization of the entire reciprocating portion of the wire running at a regular speed. Thus, there is a reduction in processing accuracy and a decrease in the volume of work which can be carried out.

(6) When aiming to improve cutting accuracy and increase the volume of work by increasing the speed of operation, it is desirable that the reciprocating motion of the wire preferably be carried out in a low number of cycles having long strokes to facilitate the uniform permeation of abrasive fluid, the smooth discharge of swarf, and to prevent vibrations. But, a drawback occurs in that the use of a crank mechanism in reciprocating the movable pulley unavoidably has inherent limits with respect to the radius of its revolution, and a large number of pulleys in the movable-pulley type double-speed mechanism is necessary to create a long stroke. Thus, the drive system of the device must be large and costly, and tends to give rise to vibration and maintenance problems.

(7) The drive system is so constructed that an endless rope is fed in one direction by a motor, thereby imparting differential rotary motion to the reversibly rotating multigrooved rollers through the movable-pulley type double-speed mechanism and crank mechanism in such a manner that a wire traveling synchronously with the endless rope is gradually fed from the feeding side to the recovery side of the device. Accordingly, with this mechanism, variations in the reciprocating running speed of the wire occur so that when a high-speed operation is carried out, variations in the reciprocating running speed of the wire become all the more remarkable, whereby stabilization due to uniform permeation of abrasive fluid between the workpiece and wire, which is enhanced by a constant running speed of the wire, is nonetheless prevented, whereby swarf cannot be smoothly discharged. Thus, the cutting accuracy is lowered and the volume of work to be carried out is decreased.

SUMMARY OF THE INVENTION

Accordingly, it is a first object of the invention to provide a wire saw in which there is point contact between a wire and the workpiece, thereby accelerating the speed of cutting to heighten the cutting process precision.

It is a second object of the invention to provide a wire saw in which, owing to the point contact between the wire and the workpiece, a larger concentrated load is exerted on the workpiece and the permissible tension is made the most of, thereby accelerating the cutting speed.

It is a third object of the invention to provide a wire saw in which swarf from the cut portion of the workpiece can be discharged with ease, and free abrasive, when used, can permeate uniformly into the contact portion to thereby accelerate the speed of the cutting process.

It is a fourth object of the invention to provide a wire saw in which a workpiece can be cut in a manner which reduces or obviates conventional subsequent machining processes, and which reduces the consumption of wire, grindstone, lapping oil, and the like to a minimum, whereby the operation cost of the saw is reduced.

It is a fifth object of the invention to provide a wire saw in which a reversing rotary motion of multigrooved rollers designed to impart reciprocating running motion to the wire is directly provided by a drive motor, and in which wire tension and slack are absorbed by a movable-pulley type double-speed mechanism, whereby little energy is lost, and a speedy operation can be carried out with the aim to improve cutting accuracy, to increase the amount of work, and to enable a compact device to be realized.

It is a sixth object of the invention to provide a wire saw in which wire tension and slack are absorbed by a movable-pulley type double-speed mechanism, and, in which the drive system thereof may have a lower transmission capacity and may be compact owing to the use of an endless rope which is simple, flexible, capable of performing multi-shaft transmission, inexpensive and easily available.

It is a seventh object of the invention to provide a wire saw in which wire tension and slack are absorbed by movable-pulley type double-speed mechanisms, to thereby enable a speedy operation to be carried out and cutting accuracy to be improved, and, moreover, wherein the entire length of the saw is utilized effectively to reduce the number of pulleys over a given stroke, and wherein no change in wire tension occurs such that a disconnection of the wire from the wire drive system is prevented.

DETAILED DESCRIPTION OF THE PREFERRED EMBODIMENTS

The first embodiment which is shown in FIG. 1 through FIG. 5 will now be described.

Figure 1:
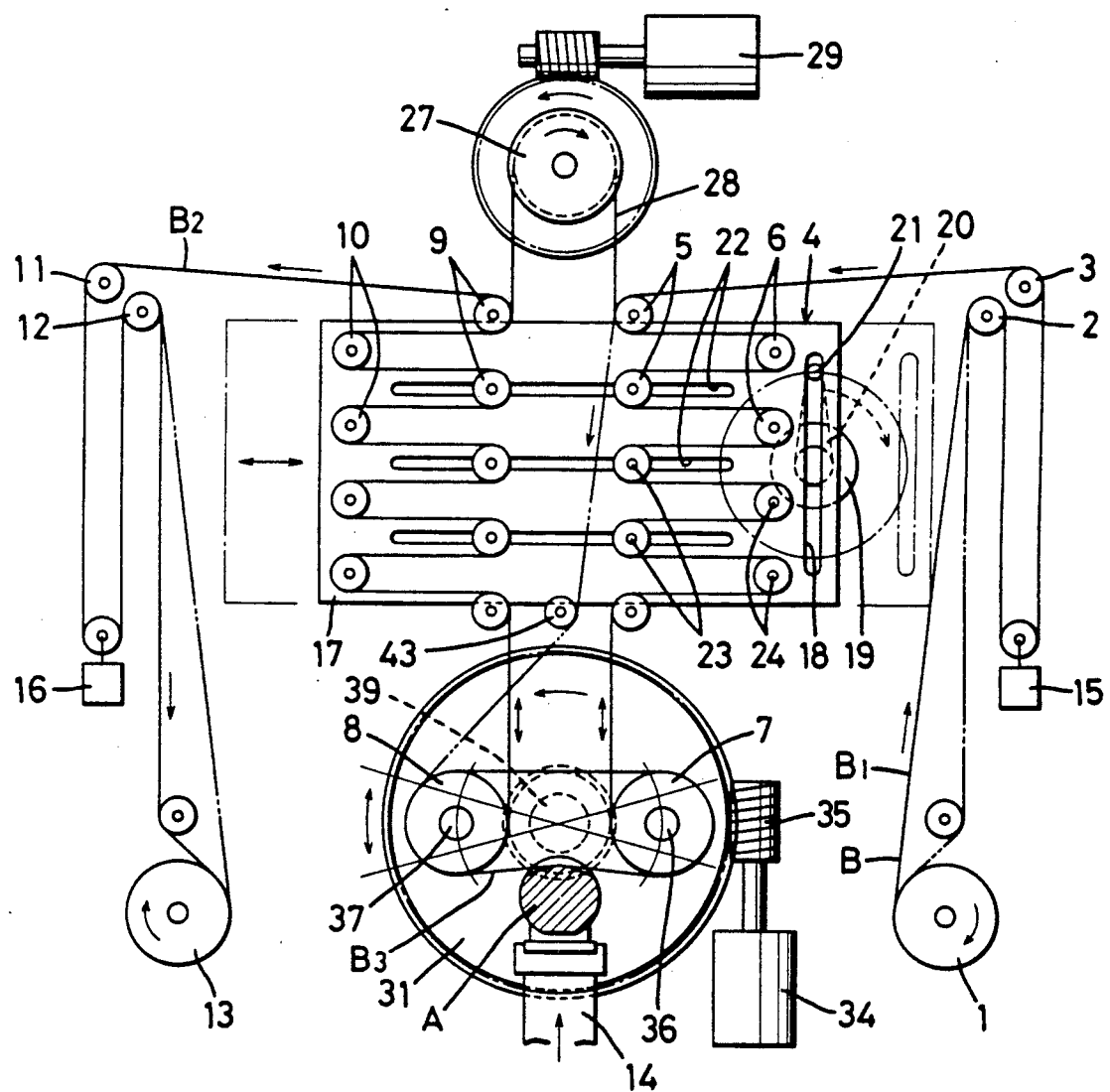
FIG. 1 is a front elevation view of a first embodiment of a wire saw according to the present invention.
Figure 2:
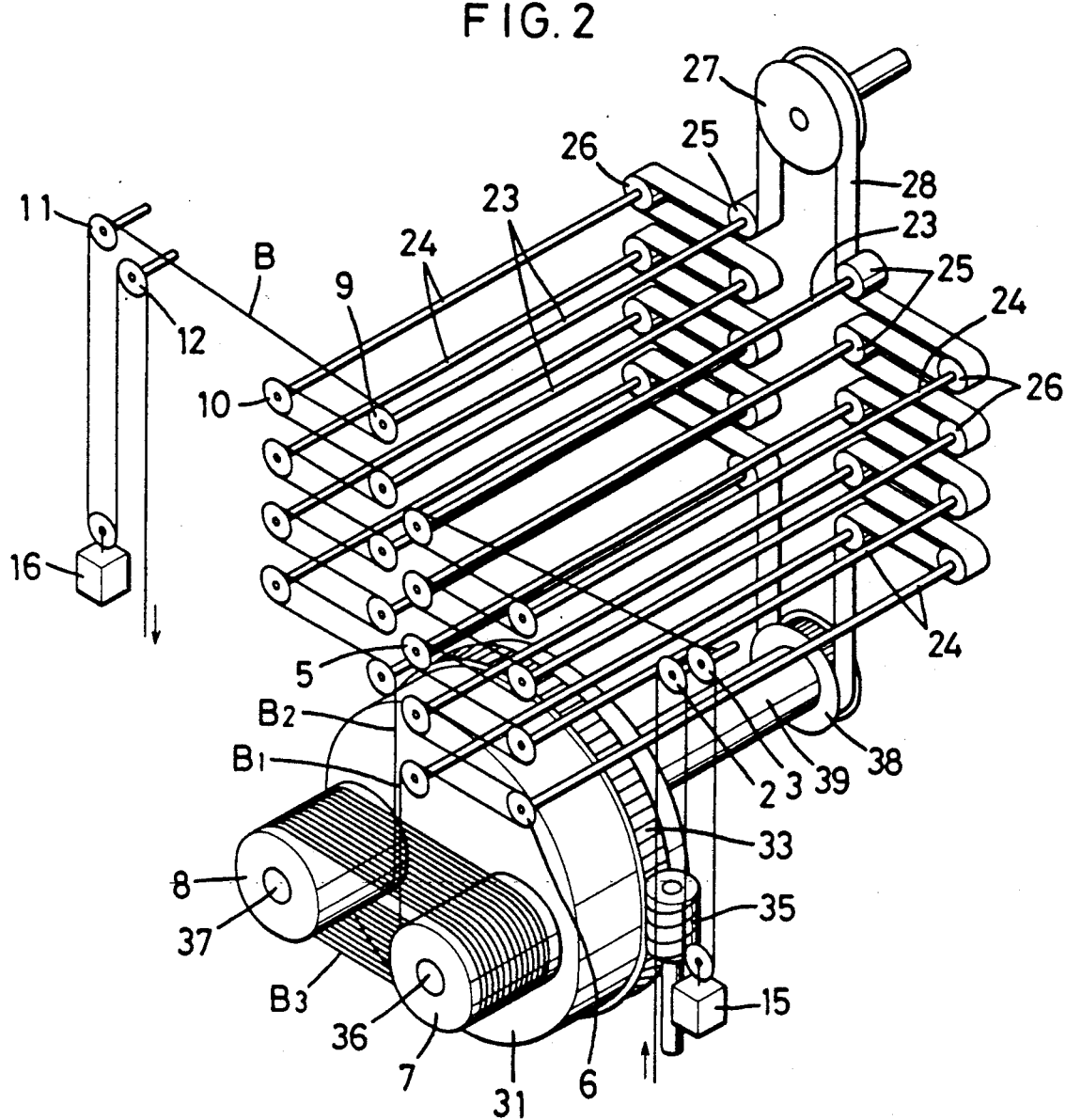
FIG. 2 is a perspective view of the wire saw.

FIGS. 1 and 2 show the entire structure of the wire saw in which the wire B, led out from feeding side reel 1, extends, in turn, over intermediate rollers 2, 3 and then over fixed rollers 5 and movable rollers 6 of a reversible double-speed mechanism 4, and thereafter, is wound around the outer periphery of a plurality of multigrooved rollers 7, 8 disposed under the mechanism 4. Then, the wire extends, in turn, over fixed rollers 9 and movable rollers 10 of mechanism 4, and is taken up by a recovery reel 13 through intermediate rollers 11, 12. Immediately below the wire B being fed between multigrooved rollers 7, 8 is disposed a mounting table 14 for supporting workpiece A and moving workpiece A up and down.

Feeding side $B_1$ and recovery side $B_2$ portions of wire B described above are placed under fixed tension by means of weights 15, 16 hanging from intermediate rollers at 2, 3 and 11, 12.

The mechanism 4 described above is so constructed that a longitudinal elongate hole 18 is formed in a slide carriage 17 capable of reciprocating in a horizontal direction; and a pin 21 secured to a crank arm 20 of a motor 19 extends into the hole 18 whereby rotation of pin 21 causes slide carriage 17 to move back and forth in a horizontal direction at a regular stroke.

While each fixed roller 5, whose axle 23 passes through a horizontally elongate hole 22 formed in slide carriage 17, is not affected by reciprocal motion of carriage 17, each movable roller 6 directly secured to carriage 17 is moved toward and away from a fixed roller 5 as the carriage 17 moves back and forth.

Pulleys 25, 26 are fixed to axles 23, 24 of fixed rollers 5 and movable rollers 6, respectively. And the endless belt 28 extends from pulley 27 over pulleys 25, 26 of the reversible double-speed mechanism 4 in the same manner that wire B extends over the rollers groups 9, 10; and pulley 27 is driven to rotate in one direction by motor 29 driven so as to synchronously move fixed rollers 5 and movable rollers 6 in association with the movement of wire B.

The above-described multigrooved rollers 7, 8 are secured to revolution member 31 disposed in the area immediately below mechanism 4, and are reversibly driven by the above-described endless belt 28 due to the reciprocating motion of slide carriage 17, whereby wire extended over multigrooved rollers 7, 8 is reversibly fed at a double speed.

Figure 4:
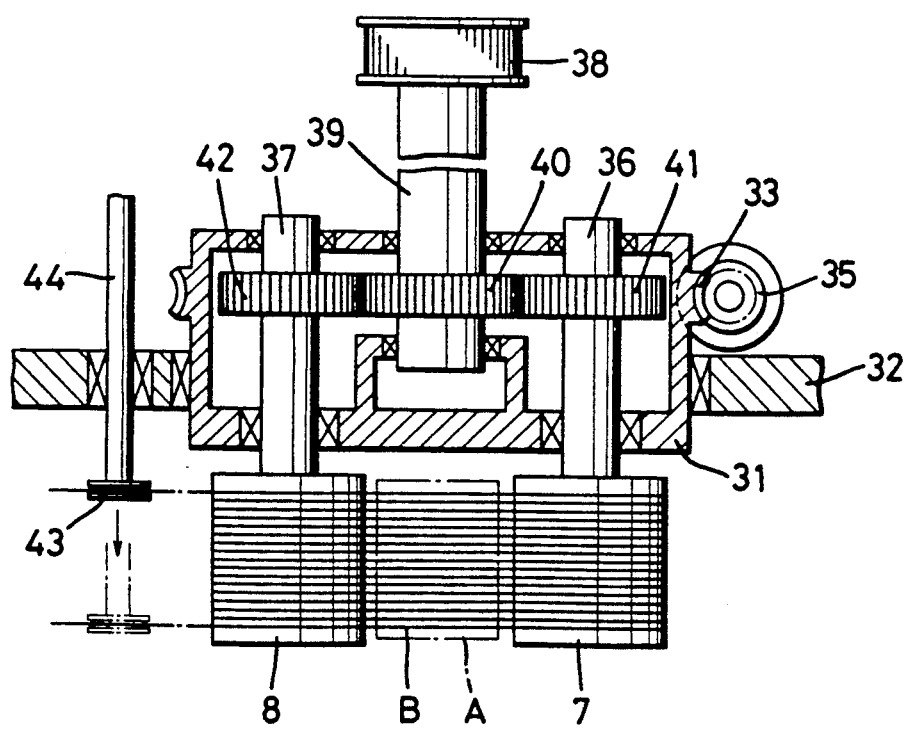
FIG. 4 is a transverse plan view of the multigrooved roller portion.

As shown in FIG. 4, revolution member 31, formed like a disk, is rotatably supported, about the horizontal axis thereof as a center, by fixed supporting wall 32, and a worm wheel 33 provided at the outer periphery thereof is engaged by a worm gear 35 of drive motor 34, to thereby be given a reciprocating revolution over a predetermined angular extent.

The multigrooved rollers 7, 8 are rotatably supported about horizontal axles 36, 37 by revolution member 31 on one one surface thereof, with the axle 39 defining the horizontal axis of member 31 interposed therebetween, while, on the other surface thereof, they are interlocked by gears 40, 41, 42 mounted to axles 39 of pulley 38 and axles 36, 37 of the above-described rollers 7, 8, respectively.

Since endless belt 28 is wound over pulley 38, the rollers 7, 8 are rotated synchronously and reversibly, thereby enabling the wire B reeved around the outer periphery thereof to reciprocate and, at the same time, to move to the recovery side.

Because of the reciprocating revolution of revolution member 31, the work cutting portion $B_3$, running between multigrooved rollers 7, 8, is swung about the horizontal axis of member 31 to thereby cut the work A in a circular arc.

In the drive mechanism of member 31 described above, a pulley and a belt may be used instead of the worm wheel 33 and worm gear 35 shown in the drawing.

Since revolution member 31 can be rotated fully by motor 34, the reeving of turns of wire over the outer periphery of rollers 7, 8, to form rows of the wire, can be conducted in an automatic way.

In other words, immediately above the revolution member 31 are provided a roller 43 and a roller moving control shaft 44 for moving said roller 43 axially. As shown in FIG. 1 in chain lines, wire B led out from roller 43 is brought near the outer periphery of multigrooved rollers 7, 8 so that wire B can be wound around said rollers at regular intervals by continuous rotation of revolution member 31 together with axial movement of control shaft 44. Thus, a winding operation, which has been conventionally carried out in the prior art, can now be performed in an automatic manner to save time.

In the wire saw according to the invention as described above, the rotation of belt 28 by drive motor 29 and the reciprocating motion of reversible double-speed mechanism 4 by motor 19 provide the wire B with both a back and forth motion and movement that feeds the wire B to the recovery side at the same time. And, as workpiece A is pressed against the wire running between rollers 7, 8, a mixed fluid of abrasive and lapping oil is supplied to a contact portion therebetween.

Figure 5:
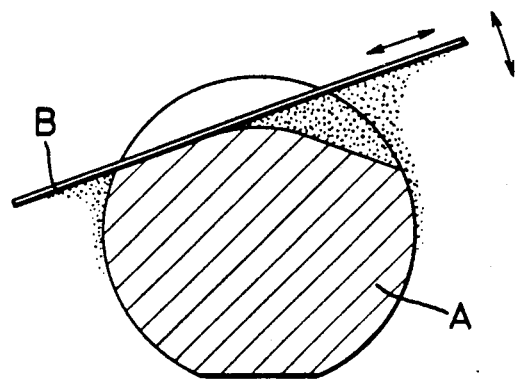
FIG. 5 is an enlarged sectional view of a portion of a workpiece being cut by the wire saw.

The workpiece A is cut between multigrooved rollers 7, 8 by the swinging wire B while revolution member 31 is alternately rotated by motor 34. During the cutting of workpiece A with the swinging wire extending between rollers 7, 8, the contact between the wire B and the workpiece A is close to point contact as shown in FIG. 5, so that a concentrated load is exerted at a contact portion and the permissible tension is utilized to the fullest extent.

The effective utilization of this tension designed to impart hardness to wire B is so significant that it is an essential characteristic in accelerating the cutting process and improving the precision of the surface thus cut.

In addition, since the wire B contacts workpiece A nearly at a point, free abrasive permeates uniformly with ease into the contact portion, and yet facilitates the discharge of swarf, thus accelerating the cutting process feeding speed as well as increasing the cutting process accuracy.

Moreover, it is possible to reduce or omit subsequent processing of the workpiece, and consumable materials such as wire, abrasive, lapping oil and the like are kept to a minimum, thereby reducing the costs associated with the cutting operation.

Figure 6:
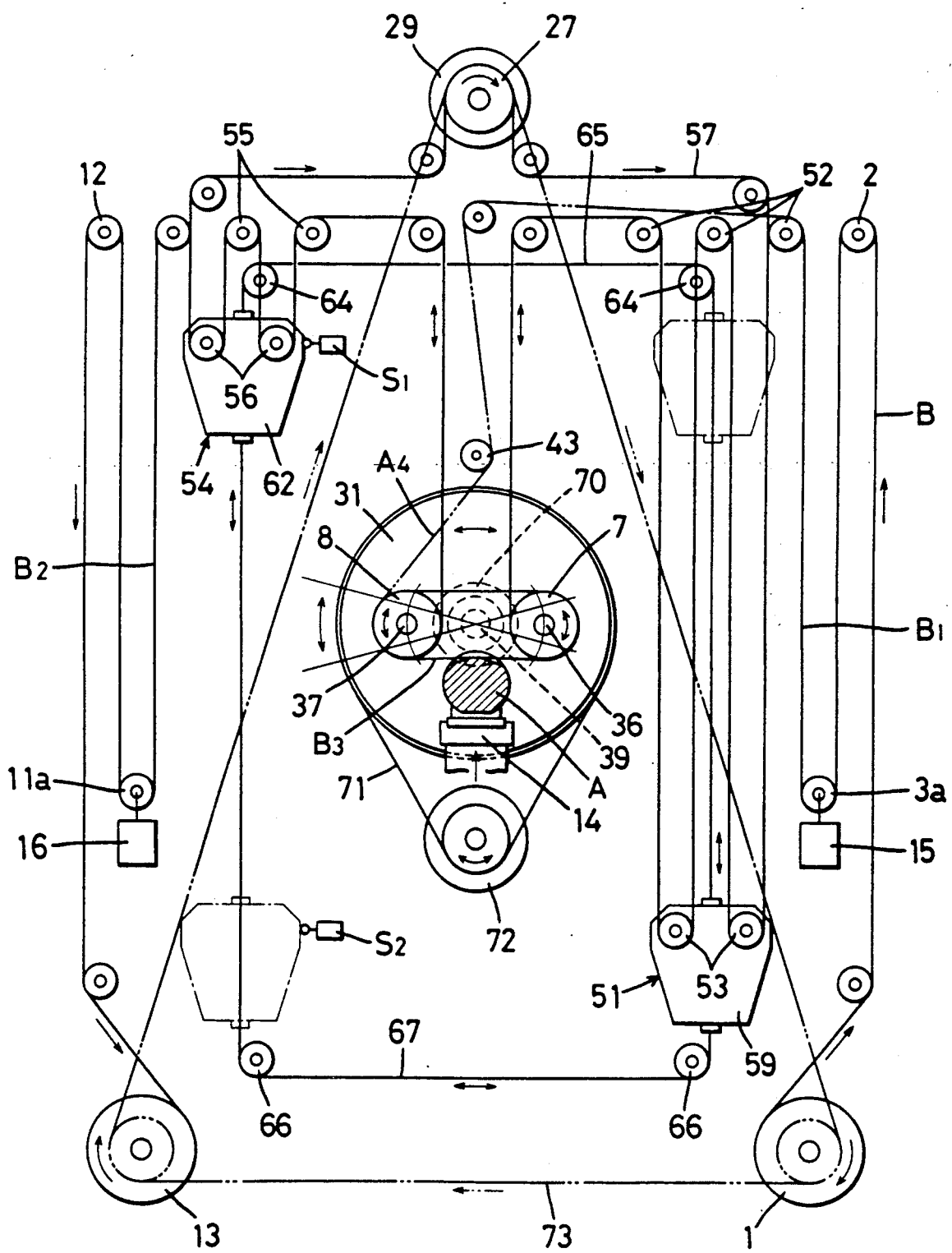
FIG. 6 is a front elevation view of a second embodiment of a wire saw according to the present invention.
Figure 7:
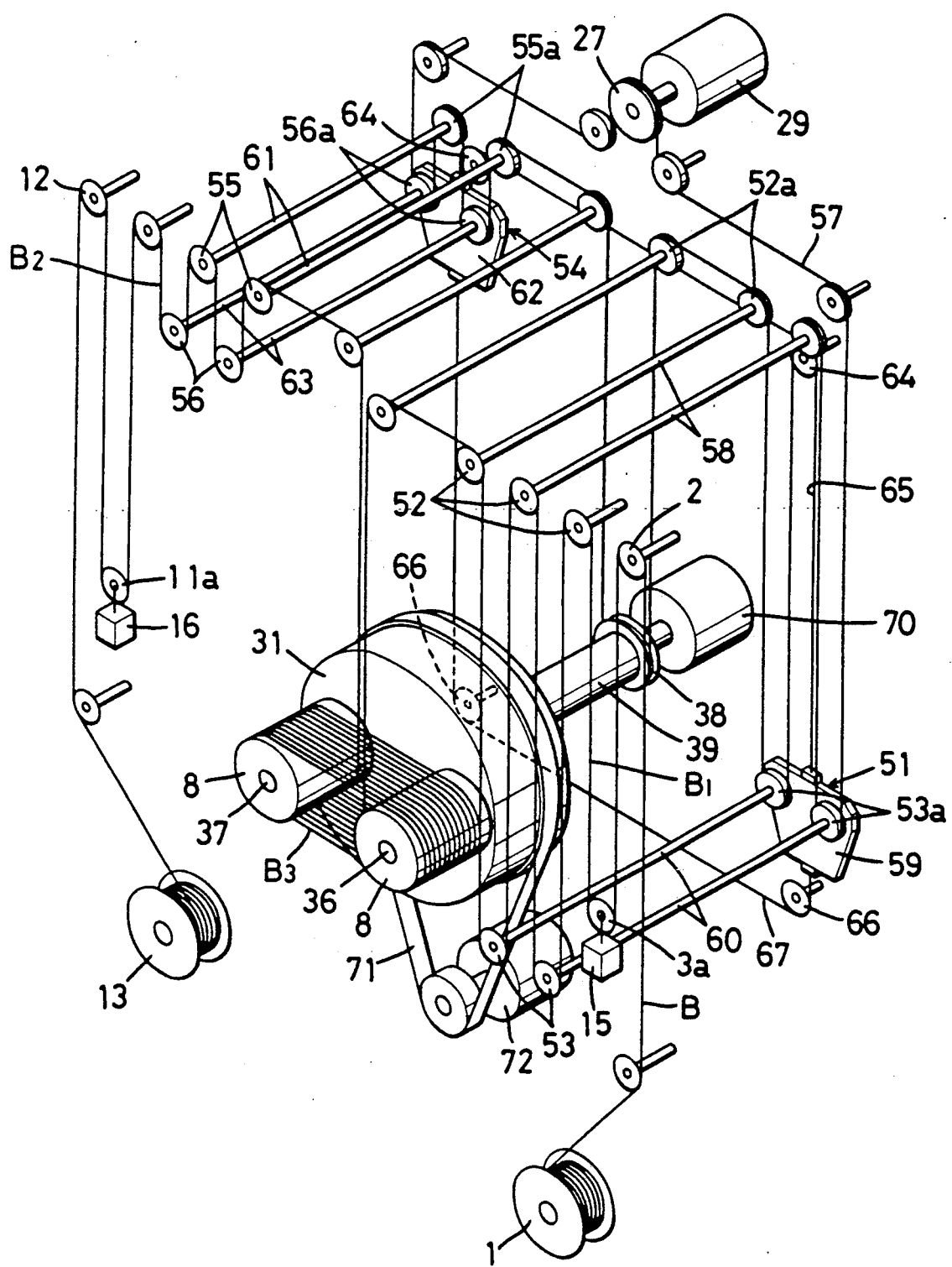
FIG. 7 is a perspective view of the wire saw of FIG. 6.
Figure 8:
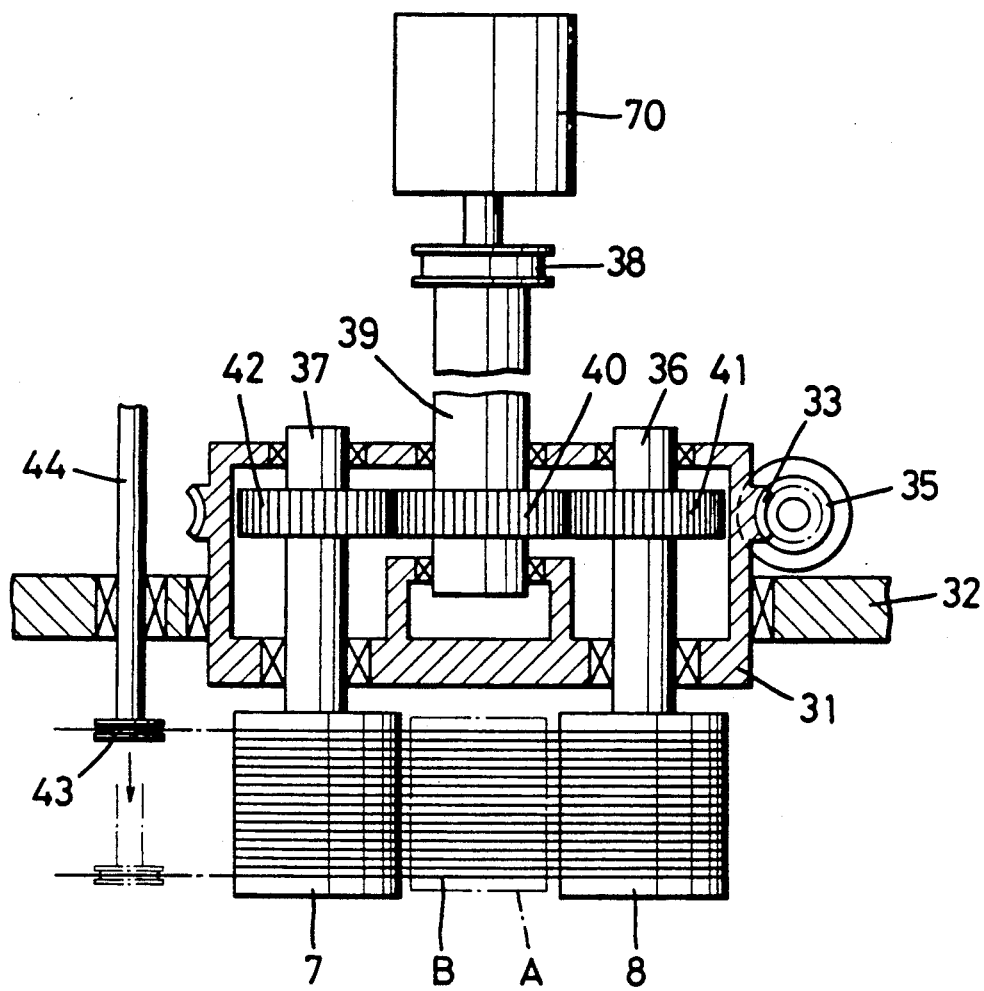
FIG. 8 is an enlarged transverse plan view of a multigrooved roller portion of the saw of FIG. 6.
Figure 10:
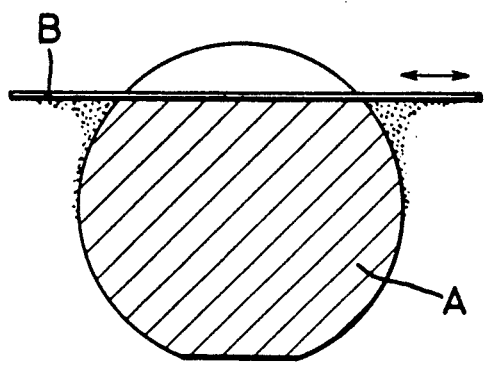
FIG. 10 is an enlarged sectional view of a portion of a workpiece being cut by a conventional wire saw.

Next, a second embodiment as shown in FIG. 6 through FIG. 8 will be described. The same components as those in the first example are designated by the same reference numerals.

In FIGS. 6 and 7, wire B, led out from feeding side reel 1, extends, in turn, over intermediate roller 2 and roller 3a and then over fixed pulleys 52 and movable pulleys 53 of movable-pulley type double-speed mechanism 51, and, thereafter, is wound around the outer periphery of a plurality of multigrooved rollers 7, 8 in turns forming rows of the wire. Then, the wire extends in turn over fixed pulleys 55 and movable pulleys 56 of mechanism 54 and is taken up by recovery side reel 13 through roller 11a and intermediate roller 12. Immediately below that portion of wire $B_3$ being fed between multigrooved rollers 7, 8 is disposed a mounting table 14 for supporting workpiece A and moving workpiece A up and down. The feeding side $B_1$ and the recovery side $B_2$ portions of wire B described above are placed under fixed tension by means of weights 15, 16 hanging from rollers 3a, 11a.

In order to impart fixed tension to the wire B, an electric sliding clutch may be used.

Both movable-pulley type double-speed mechanisms 51, 54 are disposed at the feeding side $B_1$ and recovery side $B_2$ for balancing the system. An endless rope 57 extends over mechanisms 51, 54 in a manner in which rope 57 will move along a corresponding locus and synchronously with the wire B.

The movable-pulley type double-speed mechanism 51 at wire B feeding side $B_1$ has the following structure. A plurality of shafts 58 arranged in horizontal rows at fixed positions have at opposite ends thereof fixed pulleys 52 for receiving the wire and also fixed pulleys 52a receiving the endless rope. Below the group of fixed pulleys 52a is disposed a slide carriage 59 movable in a vertical direction with a plurality of shafts 60 horizontally fixed thereto. And, at opposite ends of shafts are secured movable pulleys 53 receiving the wire and movable pulleys 53a receiving the endless rope.

The movable-pulley type double-speed mechanism 54 at the recovery side $B_2$ has a structure similar to that of double-speed mechanism 51. A plurality of shafts 61 have at both ends thereof fixed pulleys 55 receiving the wire and fixed pulleys 55a receiving the endless rope. And, below the group of fixed pulleys 55a is disposed an up-and-down moving slide carriage 62, to shafts 63 of which are secured movable pulleys 56 receiving the wire and movable pulleys 56a receiving the endless rope.

At the wire feeding side $B_1$, the wire B extends in turn over fixed pulleys 52 and movable pulleys 53 of mechanism 51, and, similarly, at the wire recovery side $B_2$ the wire B extends over the fixed pulleys 55 and the movable pulleys 56 of the double-speed mechanism 54.

As the endless rope 57 also extends in turn over fixed pulleys 52a and movable pulleys 53a, and over pulleys 55a and 56a, the wire B and endless rope 57 are parallel.

The slide carriages 59 and 62 of the double-speed mechanisms 51, 54 described above are placed under a fixed tension by upper part connection rope 65 extending over upper fixed pulleys 64, 64 and lower part connection rope 67 extending over lower fixed pulleys 66, 66, so as to be connected in an endless manner, whereby slide carriages 59, 62 move in counter-directions to each other in a linear, up-and-down manner to thereby absorb tension and slack generated alternately at the feeding side $B_1$ and recovery side $B_2$ portions of wire B.

The endless rope 57 described above may be made of steel wire, plastics, or composite materials, alone or in combination, various sizes of which are easily available at low cost. In addition, the pulley wheels used for fixed pulleys 52a, 55a, and, movable pulleys 53a, 56a, and so forth, are simple machine elements low in price. Moreover, a rope generates less noise and vibration than a belt when rotated at high speed, and, even when the pulley wheel diameter is reduced, no fluctuation occurs in rotation. It has also an advantage in that a disconnection will not occur due to some change in tension of the wire B moving synchronously therewith.

The above-described group of multigrooved rollers 7, 8 is fixed to revolution member 31 in the area between both double-speed mechanisms 51, 54. As shown in FIG. 8, the member 31 is rotatably supported by fixed supporting wall 32 about horizontal central shaft 39. On one surface side of member 31 are fixed horizontal shafts 36, 37, to which the multigrooved rollers 7, 8 are fixed, respectively. The central shaft 39 and the shafts 36, 37 are interlocked by engaging gears 40, 41, 42. The drive motor 70, which rotates the rollers 7, 8 reversibly, is directly connected to the central shaft 39.

Accordingly, the drive motor 70 directly provides the multigrooved rollers 7, 8 group with reversible rotation which, in turn, imparts reciprocating motion to the wire B wound thereover.

Figure 3:
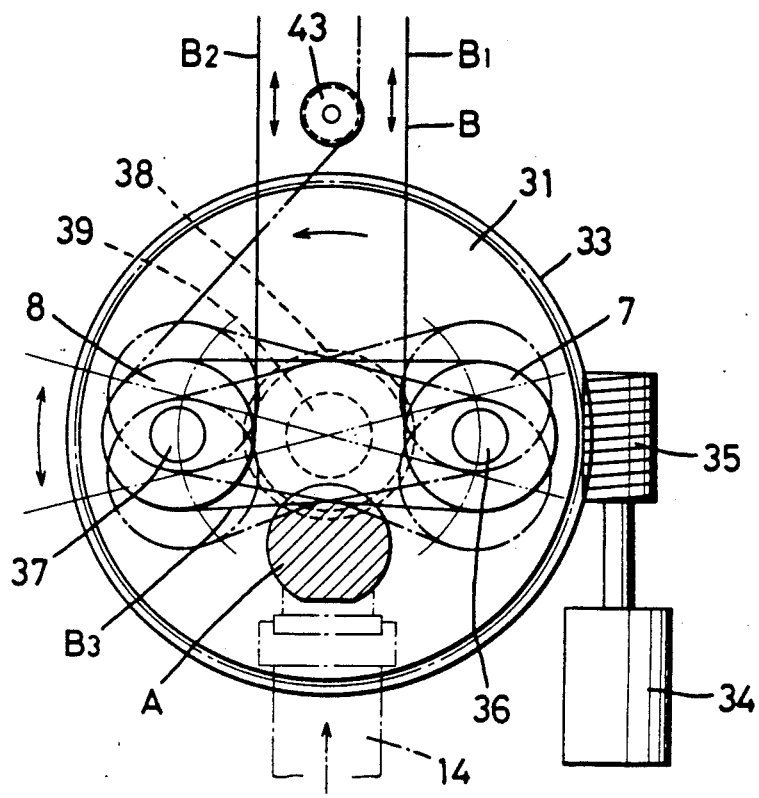
FIG. 3 is an enlarged front elevation view of a multigrooved roller portion of the wire saw.

As shown in FIG. 3 of the embodiment, the revolution member 31 is given a predetermined angular back-and-forth motion by the engagement of the worm wheel 33 provided on outer periphery thereof with the worm gear 35 of drive motor 34, whereby the work cutting portion $B_3$ of the wire B running between rollers 7, 8, swings with the rotary axis of member 31 as the center to thereby cut the workpiece A in a circular arc, as shown in FIG. 5.

The drive mechanism of revolution member 31 described above may be driven by motor 72 using pulleys and a belt 71 as shown in FIGS. 6 and 7. In any case, member 31 can be rotated fully by motors 70, 72 so that a winding operation, in which wire B is wound in parallel turns onto multigrooved rollers 7, 8 can be conducted in an automatic manner.

In other words, immediately above revolution member 31 are disposed the roller 43 and the roller movement control shaft 44 for moving roller 43 axially, to thereby wind wire B automatically around the outer periphery of rollers 7, 8 at regular intervals, as in the first embodiment.

In order to directly reversibly rotate the above-described rollers 7, 8, pulley 38 is secured to central shaft 39, to which shaft 39 the drive motor 70 is directly connected. And endless rope 57 running between double-speed mechanisms 51, 54, extends over pulley 38 so that endless rope 57 is driven synchronously with the reciprocating motion of wire B. By so doing, slide carriages 59, 62 are reciprocated in counter-directions to each other in a linear, up-and-down manner to thereby absorb tension and slack alternately generated at the feeding side $B_1$ and recovery side $B_2$ portions of the wire.

The upper running portion of endless rope 57 extends over pulley 27 of wire feeding and recovery motor 29, which, in the embodiment of FIG. 6, rotates wire feeding reel 1 and wire recovery reel 13 through an endless driving chain 73, thus gradually feeding the wire B from feeding reel 1 to recovery reel 13. The wire reels 1, 13 may be driven, alternatively, by a separate motor.

Accordingly, while undergoing multiple movements such as back-and-forth running movement caused by the reversible rotation of multigrooved rollers 7, 8, swinging circular arc movement, and, linear movement from feeding side $B_1$ to recovery side $B_2$, the wire B cuts the workpiece A.

In addition, as shown in FIG. 6, upper limit detector switch S1 and lower limit detector switch S2 are disposed within the range of vertical movement of slide carriage 62, to limit the amount of rotation of drive motor 70 in each of opposite directions.

In the second embodiment of the wire saw according to the invention, the endless rope 57 and both the feeding side reel 1 and the recovery side reel 13 for feeding wire B from side $B_1$ to side $B_2$ are driven by motor 29. At the same time, drive motor 70 directly gives the rollers 7, 8 a reversing rotary motion causing the wire B to move back and forth. And, furthermore, the above-described drive motor 70 drives the endless rope 57 over a corresponding locus and in synchronism with the wire B, which is pressed against the workpiece A with a mixed fluid of abrasive and lapping oil being supplied to the contact portion between wire B and workpiece A.

In cutting the workpiece A, motor 34 (72) rotates revolution member 31 alternately in a reversing manner to thereby swing the wire between multigrooved rollers 7, 8 as shown in FIGS. 3 and 5.

The above-described wire B, when reciprocating, generates tension and slack alternately at feeding side $B_1$ and recovery side $B_2$.

The endless rope 57 travels along a corresponding locus and in synchronism with wire B. And, at the sides of movable-pulley type double-speed mechanisms 51, 54, one of the slide carriages 59, 62 is raised at that side where tension on the wire B is generated and, likewise, the other is lowered where slack occurs, so that, the alternate up-and-down linear movement of the carriages 59, 62 takes up tension and slack generated at the $B_1$ side and $B_2$ side portions of the wire B.

In the second example, the drive motor 70 is designed to impart reversing rotary motion to multigrooved rollers 7, 8 in order to reciprocate the wire B, whereby wire B moves linearly at a stable, regular speed such that the entire running area is utilized effectively, abrasive liquid permeates uniformly between workpiece A and wire B, swarf is discharged smoothly, process accuracy is improved, and the relative amount of work carried out is increased.

In addition, the multigrooved rollers 7, 8 are directly given a reversing rotary motion by drive motor 70 and movable-pulley type double-speed mechanisms 51, 54 each comprising a slide carriage provided with both fixed and movable pulleys. The mechanisms 51, 54 balance the system upstream and downstream of the rollers 7, 8 in order to absorb tension and slack in the wire B, resulting in less energy being required to move the double-speed mechanisms 51, 54. Thus, a high-speed operation can be performed to improve the cutting accuracy and to increase work volume, and the saw can be compact.

Moreover, because the drive motor 70 directly gives the rollers 7, 8 a reversing rotary motion to reciprocate the wire, there is no limit in the stroke of such a drive system. Furthermore, double-speed mechanisms 51, 54 designed to absorb tension and slack in the wire B may be disposed freely, because of the effective use of the whole length of the machine device, to reduce the number of pulleys.

The wire feeding and recovery motor moves the endless rope 57 in one direction to give the differential motion to the double-speed mechanisms 51, 54 designed to absorb tension and slack in the wire B, thus in turn moving the wire gradually from the feeding side to the recovery side synchronously with the endless rope 57. Since the wire B, which extends over rollers 7, 8, is reciprocated by motor 70, which drives the rollers 7, 8 at a regular speed, variations in speed due to the above-described differential movement do not occur, thereby enabling a uniform permeation of the liquid between workpiece A and wire B, a smooth discharge of swarf, improved cutting accuracy and an increase in the volume of work performed. In addition, the supply and recovery of new and old wires, and the absorption of tension and slack alternately generated upstream and downstream of the rollers 7, 8, are dealt with in a satisfactory manner by using endless rope 57 which is made to follow a corresponding locus and to move synchronously with the wire B, so that no change in tension occurs in wire B thus preventing a disconnection of the wire from the drive system and improving the cutting accuracy.

Figure 9:
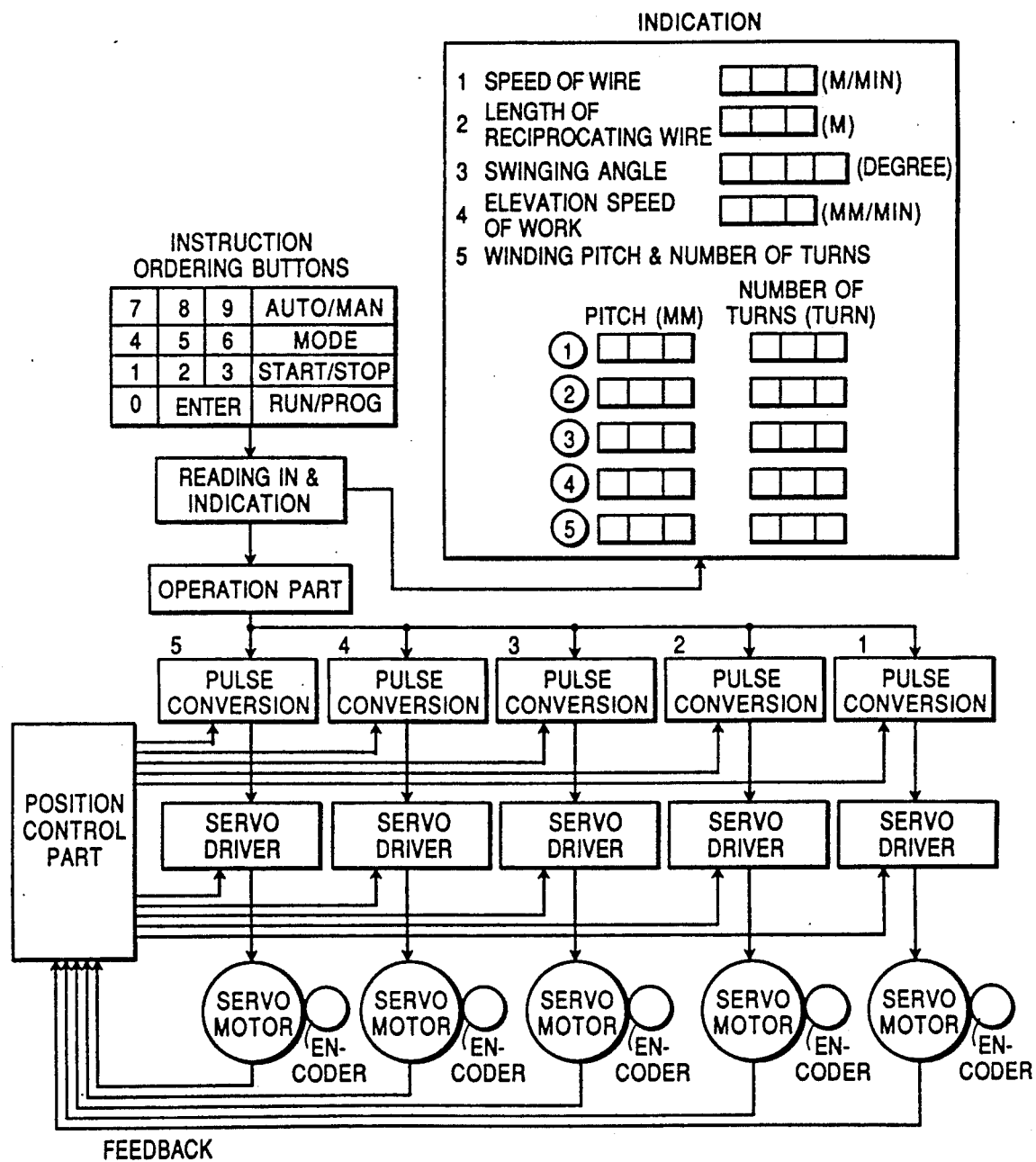
FIG. 9 is a block diagram illustrating how the wire saw according to the present invention is controlled by a microcomputer.

As shown in FIG. 9, when the wire saw is controlled by a microcomputer, the following operating parameters can be controlled optionally according to values set: 1. the wire feeding speed, 2. the extent of reciprocation of the wire, 3. the swinging angle of the multigrooved rollers, 4. the speed at which the workpiece is raised, 5. the winding pitch and number of turns of the wire on the multigrooved rollers.

For example, when the swing angle of item 3 above is to be set at 15.50 degrees, instruction ordering buttons 1.5.5.0 are pushed. This 1 5 5 0 appears in the "3 swinging angle" display of the "indication" panel".

After the above has been set, the ENTER button is pushed.

The automatic operation is then performed by the various control elements→, reading in and indication means→operation part (process means for processing the instructions)→pulse conversion means→servo driver→servo motor→encoder.

A portion of the operation of the device can be initiated by pushing the RUN button of the "instruction ordering buttons".

What is claimed is:

1. A wire saw for cutting a workpiece, said saw comprising:
   a wire feed reel, and a supply of wire wrapped therearound;
   a wire recovery reel;
   a pair of spaced apart rollers operatively disposed in the saw between said wire feed reel and said wire recovery reel, each of said rollers having a series of grooves extending around the circumference thereof;
   a revolution member supporting said grooved rollers, said revolution member rotatably supported in the saw about an axis of rotation thereof located between the axes of rotation of said grooved rollers;
   revolving means operatively connected to said revolution member for revolving said revolution member about the axis of rotation thereof to wrap the wire a number of turns around said grooved rollers;
   axial feed means for moving said wire and said grooved rollers relative to one another in the axial direction of said grooved rollers as said rollers are revolved by said revolving means so as to form rows of wire extending between said rollers;
   support means for supporting a workpiece adjacent the rows of wire;
   continuous feed means drivingly connected to said wire for continuously gradually feeding said wire from said wire feed reel to said wire recovery reel and over said grooved rollers operatively disposed therebetween; and
   reciprocating feed means drivingly connected to said wire for reciprocating the rows of wire between said grooved rollers as the wire is continuously gradually fed by said continuous feed means.

2. A wire saw as claimed in claim 1, wherein said revolution member has a worm gear extending therearound coaxially with the axis of rotation thereof, and said revolving means includes a worm wheel meshing with said worm gear.

3. A wire saw as claimed in claim 1, wherein said revolving means includes a pulley supported in the saw with the axis of rotation thereof disposed parallel to the axis of rotation of said revolution member, and an endless belt reeved around said pulley and said revolution member.

* * * * *